Jan. 7, 1936.   T. H. LONG   2,027,239
GRID GLOW TUBE POSITION RELAY COMBINATION
Filed Nov. 12, 1932
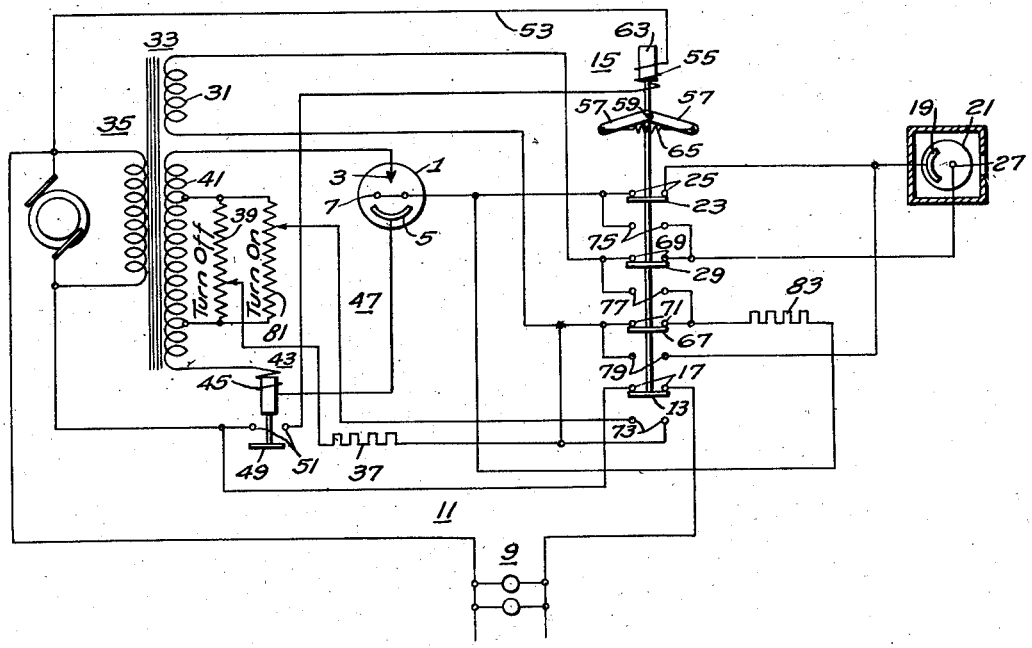
WITNESSES:
E. O. McCloskey.
Hymen Diamond
INVENTOR
Thomas H. Long.
BY F. W. Lyle,
ATTORNEY Patented Jan. 7, 1936

2,027,239

UNITED STATES PATENT OFFICE 2,027,239

GRID-GLOW TUBE POSITION RELAY COMBINATION

Thomas H. Long, Irwin, Pa., assignor to Westinghouse Electric & Manufacturing Company, East Pittsburgh, Pa., a corporation of Pennsylvania Application November 12, 1932, Serial No. 642,467

10 Claims. (Cl. 250—41.5)

My invention relates to control apparatus and it has particular relation to apparatus for automatically controlling the artificial illumination of a region.

Illumination control apparatus constructed and operated in accordance with the teachings of the prior art of which I am aware, in general, comprises a photo-sensitive device subjected to the illumination of the region controlled and an electric discharge device for amplifying the output of the photo-sensitive device. The output of the electric discharge device, in general, feeds into a system of relays whereby the activity of the illuminating units provided for the region is controlled. When the natural illumination to which the photo-sensitive device is subjected falls to a predetermined low level, the output of the electric discharge device is so varied that the relays are actuated and an artificial illumination is energized. On the other hand, when the totality of natural and artificial illumination to which the photo-sensitive device is subjected rises to a predetermined high level, the output of the electric discharge device is correspondingly varied and the relays are energized to deenergize the units.

In the past, the practice in commercial apparatus has been to utilize an electric discharge device of the high vacuum type for amplifying the output of the photo-sensitive device. An electric discharge device of this type has a continuous characteristic, but its output is comparatively low.

I have found, on the other hand, that for the present purpose, an electric discharge device of the gas-filled type, so connected in the system that it has an energized condition and a deenergized condition and is capable of only an abrupt transition from one condition to the other, can be utilized to considerable advantage. In general, the output of such a device is considerably larger than the output of a corresponding high vacuum device. On the other hand, it is more reliable in its response by reason of its abrupt characteristic than is the high vacuum device with its continuous characteristic.

However, in experiments with illumination control systems incorporating gas-filled electric discharge devices I have encountered one serious difficulty. I have found that in systems connected in accordance to the teachings of the prior art, the electric discharge device must be maintained in an energized condition for considerable periods of time, either when the artificial illumination is energized or when it is deenergized. For this reason the life of the electric discharge device utilized in the system is considerably shortened and the expense involved in utilizing such devices is considerably increased.

It is accordingly an object of my invention to provide an illumination control system incorporating a gas-filled electric discharge device in which the device shall be energized only during a short interval of time while the illuminating units are being converted either from an energized condition to a deenergized condition or from a deenergized condition to an energized condition.

Another object of my invention is to provide an illumination control system of the type incorporating an electric discharge device that has a deenergized condition and an energized condition and is capable only of abrupt transition from one condition to the other in which the electric discharge device shall be energized only for comparatively short intervals of time.

An incidental object of my invention is to provide an illumination control system of the type incorporating an electric discharge device normally maintained in a predetermined condition of excitation; in which the condition of excitation of the electric discharge device shall be varied to vary the activity of the artificial illumination and shall be immediately reverted to its normal condition after accomplishing this purpose.

Another incidental object of my invention is to provide apparatus for controlling the relationship between a power source and a work circuit which apparatus is of the type incorporating an electric discharge device normally maintained in a predetermined condition of excitation; in which the condition of excitation of the electric discharge device shall be varied when the power source is to be coupled to the work circuit or when it is to be uncoupled from the work circuit and shall be immediately after accomplishing this purpose reverted to its initial normal condition.

A further object of my invention is to provide an illumination control system of the type incorporating an electric discharge device maintained in a predetermined condition of excitation; in which the electric discharge device shall be so coupled to the other elements of the system that when the artificial illumination is deenergized, it shall be capable of responding to a proper decrease in natural illumination to cause the artificial illumination to become energized and, at the same time, shall be deenergized and so rendered responsive to a predetermined increase in the totality of natural and artificial illumination as to cause the artificial illumination to be deenergized when the totality of illumination attains a value corresponding to this increase.

More concisely stated, it is an object of my invention to provide an illumination control system that shall involve a minimum of expense as far as replacement of tubes is concerned and shall, therefore, be inexpensive to operate and to service.

According to my invention I provide an illumination control system comprising an electric discharge device preferably of the gas-filled type such as a grid-glow tube, which device incorporates a control electrode and a plurality of principal electrodes. An electric discharge device of this type may be so connected in a circuit that it remains in a deenergized condition as long as the proper potentials are applied between its control electrode and its principal electrodes. When, however, the proper potentials are applied between these electrodes, even for a short interval of time, the device becomes energized and remains in energized condition as long as the potentials impressed between the principal electrodes are high enough to maintain an arc therebetween regardless of the variation in the magnitudes of the potentials applied to the control electrode.

In the preferred practice of my invention potentials are applied to the electrodes of the electric discharge device that are of such magnitude as to normally maintain it in a deenergized condition. A photo-sensitive device is so coupled between the electrodes of the electric discharge that, when the illuminating units controlled from the output of the electric discharge device are in a deenergized condition, the anode of the device is coupled to the control electrode of the electric discharge device, and the cathode of the photo-sensitive device is coupled to one of the principal electrodes of the electric discharge device; while, when the artificial illumination is energized a change is produced in the circuit by the same system of relays as provides for the supply of energy to the illuminating units and the anode of the photo-sensitive device is uncoupled from the control electrode of the electric discharge device and is coupled to a principal electrode of the latter while the cathode of the photo-sensitive device is coupled to the control electrode of the electric discharge device.

The photo-sensitive device is thus maintained coupled to the electric discharge device in one manner or the other; depending on the condition of the illuminating units and when the natural illumination is decreased to the proper extent or the totality of natural and artificial illumination is increased to the proper extent, the electric discharge device is energized and causes the illuminating units to be energized or deenergized as the case may be. However, as soon as the electric discharge device accomplishes the purpose of changing the activity of the illuminating units, the illuminating units are locked in their newly acquired condition and the potentials applied to the electrodes of the electric discharge device are so varied that the device is again deenergized.

It is seen that in the system described hereinabove the electric discharge device is energized only during the periods during which it must accomplish its function and is thereafter deenergized. A device that is used in such a system will, therefore, be energized for so short intervals of time that it will assume the character of a substantially permanent element.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing in which the single figure is a diagrammatic view showing the essential elements of a circuit constructed in accordance with my invention.

The apparatus shown in the view comprises an electric discharge device 1 of the grid-glow type having an anode 3, a cathode 5 and a control electrode 7, all immersed in a gaseous medium. In the view, the system is shown in the condition that it assumes when the artificial illuminating units 9 are energized. The circuit 11 through the units 9 is, therefore, closed by the engagement of a movable contactor 13 of the relay 15, whereby the activity of the units 9 is controlled with a plurality of corresponding fixed contacts 17.

The control electrode 7 of the electric discharge device 1 is connected to the cathode 19 of a photo-sensitive device 21, that is subjected to the totality of natural and artificial illumination in the region for which the illuminating units 9 are provided, through a second movable contactor 23 of the relay 15 which is in engagement with a plurality of fixed contacts 25. The anode 27 of the photo-sensitive device 21 is connected to the anode 3 of the electric discharge device 1 through another movable contactor 29 of the relay 15, a section 31 of the secondary 33 of a transformer 35 whereby power is supplied to a system, an impedance 37 (preferably a resistor), a section of the winding of a potentiometer 39, which may be best designated as the "turn off" potientometer since it may be adjusted to control the illumination for which the artificial illuminating units 9 are deenergized, and a portion of the windings of a section 41 of the secondary 33 of the power supply transformer 35.

When the totality of natural and artificial illumination impinging on the photo-sensitive device 21 increases above a level predetermined by the setting of the turn-off potentiometer 39, the excitation of the photo-sensitive device 21 is increased and the electric discharge device 1, which is normally deenergized, becomes energized. A relay 43, the exciting coil 45 of which is connected in the output circuit 47 of the electric discharge device 1 is, therefore, energized and by the engagement of its movable contactor 49 with a plurality of fixed contacts 51, a circuit 53 is closed through the exciting coil 55 of the relay 15 whereby the activity of the illuminating units 9 is conrolled. The latter relay is equipped with a plurality of toggle links 57 which are pivoted about a pin 59 secured to an extension 61 of the core 63 of the relay 15. The pin 59 traverses one terminal of each of the links 57 and to the other terminals of each a tension spring 65 is secured.

When the relay 15 is energized, it is maintained in its newly acquired condition by the mechanical action of the toggle links 57 and the spring 65. Moreover, when this situation occurs, the movable contactors 13, 23, 29 and 67 of the relay 15 are disengaged from the corresponding fixed contacts 17, 25, 69 and 71 and engage a new series of fixed contacts 73, 75, 77 and 79 to provide the necessary changes in the system.

The lower movable contactor 13 of the relay whereby the circuit through the illuminating units 9 was maintained closed disengages the fixed contacts 17 and engages the fixed contacts 73 to deenergize the illuminating units 9 and to connect into the system a potentiometer 81, which may be designated as the turn-on potentiometer since it is adjusted to control the natural illumination for which the system may again be actuated.

The upper movable contactor 23 of the relay 15 disengages the fixed contacts 25 to which it was engaged thereby disconnecting the cathode 19 of the photo-sensitive device 21 from the control electrode 7 of the electric discharge device 1, and engages another set of fixed contacts 75 to connect the anode 27 of the photo-sensitive device 21 to the control electrode 7 of the electric discharge device 1. By the disengagement of still another movable contactor 67 from a plurality of fixed contacts 71, the turn-off potentiometer 39 that was originally connected to the control electrode 7 of the electric discharge device 1 through the impedance 37 and an impedance 83 (preferably a resistor) is disconnected from the control electrode 7 and by the engagement of the movable contactor 67 with another set of fixed contacts 79 the turn-on potentiometer 81 is connected to the control electrode 7 through the section 31 of the secondary 33 that is coupled to the photo-sensitive device 21 and through the impedance 83. At the same time the cathode 19 of the photo-sensitive device 21 is coupled to the cathode 5 of the electric discharge device 1 through the turn-on potentiometer 81 and through the section 41 of the secondary 33 of the transformer 35 whereby potential is applied to the electric discharge device 1.

The potentials applied to the electric discharge device 1 are now such that the illuminating units 9 are deenergized. The photo-sensitive device 21 is now coupled to the electrodes of the electric discharge device 1 in such manner that the electric discharge device becomes energized for a decrease in excitation of the photo-sensitive device. The relay 43 is, of course, now also deenergized.

It is to be noted that the relay 15 is of such character that when its coil 55 is energized its core 63 moves through a central point and assumes a position such that it can move in the opposite direction when the coil is again energized. For this reason, the coil 55 must be deenergized when the core 63 reaches an extreme position, otherwise the core 63 will be urged in the opposite direction as soon as it reaches its extreme position. This object is accomplished by providing a relay 43 of the type that drops out immediately on being deenergized. The electric discharge device 1 is deenergized as soon as the movable contactors 23 and 67 are disengaged from their corresponding fixed contacts 25 and 71. Immediately following this incident the relay 43 is deenergized and as a result the coil 55 of the relay 15 is deenergized when the core 63 reaches the extreme point.

When the natural illumination in the region for which the control system is provided falls below a predetermined level, the excitation of the photo-sensitive device 21 is so decreased that the electric discharge device 1 is energized, causing the relay 43 in the output circuit thereof to again become energized and the relay 15 whereby the activity of the illuminating units 9 is controlled to become energized. The latter relay 15 is then locked in its newly acquired condition and the circuit is so changed that it assumes the form shown in the view. The above described cycle can be repeated indefinitely as the illumination in the region under control varies.

It is to be noted that while my invention has been shown herein as specifically applied to an illumination control system, it is conceivable that it has other applications, and such applications are equivalents which lie within the scope thereof. In general, it may be said that my invention can be applied to the control of the power supply from a general power supply source to a general work circuit.

It is also to be noted that while my invention has been shown herein as incorporating a gas-filled electric discharge device of the grid-glow type having a cold cathode and while in the present instance such a device has certain advantages, my invention should not be limited to a system incorporating only such a device, but should include within its scope systems incorporating high vacuum devices, hot cathode gas-filled devices, mercury vapor or mercury pool electric discharge devices and other electric discharge devices of any general character.

Although I have shown and described certain specific embodiments of my invention, I am fully aware that many modifications thereof are possible. In particular, relay schemes of other types than the one shown may be utilized. My invention, therefore, is not to be restricted except insofar as is necessitated by the prior art and by the spirit of the appended claims.

I claim as my invention:

1. Apparatus for controlling the supply of power from a power source to a power consumption system comprising an electric discharge device and means for normally maintaining said device in a predetermined condition of excitation, means for varying the excitation of said electric discharge device, means actuated by said electric discharge device, when its excitation is so varied, to couple said power source to said power consumption system thereby to energize said power consumption system, means for locking said power consumption system in its energized condition and means actuated by said electric discharge device when its excitation is varied to revert said device to its normal condition of excitation.

2. Apparatus for controlling the supply of power from a power source to a power consumption system, said power source being then coupled to said power consumption system and said power consumption system being thereby energized; comprising an electric discharge device and means for normally maintaining said device in a predetermined condition of excitation, means for varying the excitation of said electric discharge device, means actuated by said electric discharge device when its excitation is so varied for uncoupling said power source from said power consumption system thereby to deenergize said power-consumption system, means for locking said power consumption system in its deenergized condition and means actuated by said electric discharge device when its excitation is varied to revert said device to its normal condition.

3. Apparatus for controlling the supply of power from a power source to a power-consumption system comprising an electric discharge device and means for normally maintaining said device in a predetermined condition of excitation, means for varying the excitation of said electric discharge device, means actuated by said electric discharge device, when its excitation is so varied, to couple said power source to said power consumption system thereby to energize said power consumption system, means for locking said power consumption system in its energized condition, means actuated by said electric discharge device when its excitation is varied to revert said device to its normal condition of excitation, means for varying the excitation of said electric discharge device to uncouple said power source from said power-consumption system to deenergize said power-consumption system and to lock said power consumption system in its deenergized condition.

4. Apparatus for controlling the supply of power from a power source to a plurality of illuminating units providing illumination for a region; comprising an electric discharge device and means for maintaining said device in a predetermined condition of excitation, means, to respond to the natural illumination within said region for varying the excitation of said electric discharge device when the intensity of said illumination falls to a predetermined level, means, actuated by said electric discharge device when its excitation is so varied, for coupling said power source to said illuminating units thereby to energize said units, means for locking said units in said energized condition, means, actuated by said electric discharge device when its excitation is varied to revert the excitation to its initial condition, and to cause said electric discharge device to so respond to the totality of natural and artificial illumination in said region that when said totality of illumination rises above a predetermined level, the excitation of said electric discharge device is changed, said power source is uncoupled from said illuminating units and said units are deenergized.

5. Apparatus for controlling the supply of power from a power source to a power-consumption system, said power source being then coupled to said power-consumption system and system being thereby energized comprising means, including an electric discharge device having a control electrode and a plurality of principal electrodes, for uncoupling said power source from said power-consumption system to deenergize said power-consumption system, a photosensitive device having a cathode and an anode, means for coupling the cathode of said photosensitive device to the control electrode of said electric discharge device and the anode of said photo-sensitive device to one of the principal electrodes of said electric discharge device, means, responsive to an increase in the excitation of said photo-sensitive device, for increasing the excitation of said electric discharge device, for actuating said coupling or uncoupling means to deenergize said power-consumption system and for locking said power-consumption system in deenergized condition and means responsive to the increased excitation of said electric discharge device for reducing the excitation of said electric discharge device to its normal value and for uncoupling the anode of said photo-sensitive device from said principal electrodes of said electric discharge device and coupling it to the control electrode thereof and for uncoupling the cathode of the photo-sensitive device from said control electrode and for coupling said cathode to one of the principal electrodes of said electric discharge device thereby to render said electric discharge device responsive to a decrease in the excitation of said photo-sensitive device.

6. Apparatus for controlling the supply of power from a power source to a power-consumption system comprising an electric discharge device of the type having an energized condition and a deenergized condition and being capable only of abrupt transition from one condition to the other, means responsive to a property of the region in which said power-consumption system is disposed, for energizing said electric discharge device, means actuated by said electric discharge device, when it is so energized, for coupling said power source to said power consumption system to energize said power consumption system, means actuated by said electric discharge device for deenergizing said electric discharge device after said power consumption system has been energized and means for subsequently maintaining said power consumption system in energized condition in spite of the fact that said electric discharge device has been deenergized.

7. Apparatus for controlling the supply of power from a power source to a power-consumption system comprising an electric discharge device and means for normally maintaining said device in a predetermined condition of excitation, means for varying the excitation of said electric discharge device, means actuated by said electric discharge device, when its excitation is so varied, to couple said power source to said power-consumption system thereby to energize said power-consumption system, means for locking said power-consumption system in the energized condition, means actuated by said electric discharge device, when its condition is varied, to revert said device to its normal condition and means for varying the excitation, of said electric discharge device after it has been reverted to its normal condition, whereby said coupling means is actuated to uncouple said power source from said power-consumption system to deenergize said power consumption system.

8. Apparatus for controlling the supply of power from a power source to a power-consumption system, said power source being then coupled to said power-consumption system and said power-consumption system being thereby energized, comprising an electric discharge device and means for normally maintaining said device in a predetermined condition of excitation, means for varying the excitation of said electric discharge device, means actuated by said electric discharge device when its excitation is so varied, for uncoupling said power source from said power-consumption system thereby to deenergize said power-consumption system, means for locking said power-consumption system in its deenergized condition, means actuated by said electric discharge device when its excitation is varied to revert said device to its normal condition of excitation, and means for varying the excitation of said electric discharge device after it has been reverted to its normal condition and while said power consumption system is deenergized, whereby said uncoupling means is actuated to couple said power source to said power-consumption system thereby to energize said power-consumption system and locking means is actuated to lock said power-consumption system in its energized condition.

9. Apparatus for controlling the supply of power from a power source to a power-consumption system comprising an electric discharge device and means for normally maintaining said device in a predetermined condition of excitation, means for varying the excitation of said electric discharge device when a property of the region in which said power-consumption system is disposed undergoes a predetermined change, means actuated by said electric discharge device, when its excitation is so varied, for coupling said power source to said power-consumption system to energize said power-consumption system, means for locking said power-consumption system in said energized condition and means, actuated by said electric discharge device when its excitation is varied, for reverting the excitation of said device to a condition such that its condition of excitation is the same as its normal condition of excitation and it is responsive to a change in said property of the region in which said power-consumption system is disposed that is different from the change that produced the original variation in its excitation.

10. Apparatus for controlling the relationship between a power source and a power-consumption system, said power source being capable only of being either coupled to said power-consumption system or uncoupled therefrom; comprising means for varying the relationship between said power source and said power-consumption system, means, including an electric discharge device and means for maintaining said device in a predetermined condition of excitation for controlling said varying means, means, responsive to a change in a property of the region in which said power-consumption system is disposed, for varying the excitation of said electric discharge device to vary the relationship between said source and said power-consumption system, means for locking said power-consumption system and said source in their newly acquired relationship, means actuated by said electric discharge device when its excitation is varied for reverting said device to its normal condition of excitation and means, responsive to a change in said property of the region in which said power-consumption system is disposed that is of opposite polarity to the first named change and differs therefrom in magnitude, for varying the excitation of said electric discharge device to revert the relationship between said source and said power-consumption system to its initial condition.

THOMAS H. LONG.